Patented Nov. 28, 1933

1,936,913

UNITED STATES PATENT OFFICE 1,936,913

ENAMEL IMITATION LEATHER FINISH

Dale M. Phillippi, Dayton, Ohio, assignor, by mesne assignments, to The Kay and Ess Chemical Corporation, Dayton, Ohio, a corporation of Ohio No Drawing. Application June 27, 1932
Serial No. 619,529

25 Claims. (Cl. 134—26)

This invention relates to enamels and varnishes, and particularly to a finish that imitates the appearance of leather.

This application is a continuation in part of application Serial No. 380,246, filed July 22, 1929, now Patent 1,878,316.

It is the object of this invention to provide an enamel varnish which, when applied to a suitable surface, will give to it a finish imitating leather.

It is a further object of this invention to eliminate all blown oils and preoxidized oil thereby materially reducing the cost and improving the product.

The three essential features of this invention are:

The employment of a phenol formaldehyde synthetic resin.

The mixture of China wood oil and linseed oil and their preheating in order that the resulting product may be taken to the higher degree of heat of 480, with such retardation of the polymerization of the wood oil that is necessary.

The ultimate mixing of the resin (natural or synthetic) and the oils and the carrying of their temperature above 450 degrees, that is from about 460 degrees F. to a point in the neighborhood of 480 degrees F. but not above.

It is an additional object to provide an enamel varnish which will employ in the formula cheaper gums and resins than heretofore have been possible in connection with varnishes of this type.

A typical formula is the following:

| | Pounds |
|---|---|
| Amberol B/S 1 Lt. | 67 |
| Litharge | 3½ |
| Manganese linoleate | 8½ (solid) |
| Cobalt linoleate | 2 (solid) |

| | Gallons |
|---|---|
| China wood oil | 20 |
| Linseed oil | 2¼ |
| Heavy petroleum naphtha | 14 |
| Light petroleum naphtha | 14 |

Amberol is a phenol, formaldehyde, synthetic resin. It is made as follows:—to one hundred parts of phenol aldehyde resin difficultly fusible and only partly soluble in benzol and other solvents and produced, for instance, by heating 108 parts of cresol with 60 to 75 parts of formaldehyde (30% by weight) and distilling off the water and the uncombined cresol, are added gradually to 800 parts of melted colophony. The whole mixture is then heated in an autoclave until a resin is produced which is clear in the cold, homogeneous and free from smell of phenol. The volatile substances are then removed while stirring and 100 parts of glycerol of 28° Bé. are added in small quantities whereupon the mixture is heated to 250° C. and kept at this temperature for several hours while being stirred carefully. A typical formula for amberol is shown in United States Patent No. 1,623,901.

In order to prepare this varnish, I first take 20 gallons of China wood oil or tung oil and 2¼ gallons refined linseed oil. These oils are mixed and heated at a normal rate to 480° F. They are then pulled from the fire. These oils may undergo an automatic rise in temperature thereafter beyond 480° F., but this is unnecessary and too great a rise should be avoided.

When the temperature of these oils has started to drop reaching approximately 475° F., I add 3½ pounds of litharge stirring until the litharge is taken up by the oil. The temperature of this batch is then run back and forth between 460° and 470° being held within this range for approximately 30 minutes and in some cases a little longer until sufficient body has been imparted to the oil and litharge.

Thereafter I add 8½ pounds of manganese solid linoleate and 2 pounds of cobalt solid linoleate. These soluble driers melt into the batch.

I then add 67 pounds of synthetic resin solid, known to the trade as "Amberol B/S 1 Light." This is melted at a low heat. Then the temperature is carried back to approximately 425° F.

I then thin the batch at once with 14 gallons each of heavy and light petroleum naphtha.

The resulting compound may be used by itself or in combination with the product of the formula hereinafter recited. If used with the next formula, they can be mixed together in proportion as high as one part each.

This formula is as follows:

| | Pounds |
|---|---|
| South sea gum | 67 |
| Litharge | 3½ |
| Manganese linoleate | 8½ |
| Cobalt linoleate | 2 |

| | Gallons |
|---|---|
| China wood oil | 20 |
| Linseed oil | 2¼ |
| Heavy petroleum naphtha | 20 |
| Light petroleum naphtha | 20 |

The cooking is carried out in this manner. Sixty-seven pounds of South Sea gum, also known as Batu gum, are run in the ordinary approved fashion customary in varnish making. Then 20 gallons of China wood oil and 2¼ gallons of refined linseed oil are mixed and heated slowly until they reach 300° or 350° F., then they are added slowly to the gum when the latter has been well run.

The mixture is then carried to a temperature of 460° to 470° F. and held within this range in order to impart body to the mixture for about 30 minutes or a little longer.

I then stir into the batch 3½ pounds of litharge until it is taken up and fully incorporated in the batch. The 8½ pounds of manganese solid linoleate and 2 pounds of cobalt solid linoleate are allowed to melt in the batch.

I then thin at once with 20 gallons each of heavy and light petroleum naphtha.

Turpentine may be substituted for the naphtha. Either the natural gum or a synthetic product as Amberol may be employed. When the natural product is used the result is a liquid of greater viscosity.

The fundamental basis is the combination of a gum and a low cooked China wood oil. The litharge has the function of drying the compound through and through while the manganese and cobalt linoleates act primarily as surface or finish driers. The naphthas act as thinners. The linseed oil is an antipolymerizing agent.

Be it understood that the result of my invention is applied to any suitable surface and baked in the usual manner which brings about the appearance of leather on the surface so treated with my product.

It will be understood that I desire to comprehend within my invention and within the scope of my claims such modifications as may be fairly comprehended within such claims and invention due to necessary modifications to adapt my invention to varying conditions of supply and of use and to varying purposes.

Having thus fully described my invention, what I claim as new and desire to secure by Letters Patent is:

1. In an improved varnish or enamel composition for producing imitation leather finishes, comprising the reaction product of the mixture of a synthetic resin formed of cresol, formaldehyde and colophony; and litharge, manganese linoleate, cobalt linoleate, China wood oil and linseed oil.

2. In an improved varnish or enamel composition for producing imitation leather finishes, comprising the reaction product of the mixture of a synthetic resin formed of cresol, formaldehyde and colophony; and litharge, manganese linoleate cobalt linoleate, China wood oil, linseed oil and a thinning agent such as naphtha.

3. In an improved varnish or enamel composition for producing imitation leather finishes, comprising the reaction product of the mixture of a synthetic resin formed of cresol, formaldehyde and colophony; and litharge, manganese linoleate, and oils.

4. In an improved varnish or enamel composition for producing imitation leather finishes, comprising the reaction product of the mixture of a synthetic resin, formed of cresol, formaldehyde and colophony; and litharge, manganese linoleate, oils and reducing naphthas.

5. In an improved varnish or enamel composition for producing imitation leather finishes, comprising the reaction product of the mixture of a synthetic phenol aldehyde resin, litharge, manganese linoleate, cobalt linoleate, China wood oil, linseed oil, heavy petroleum naphtha and light petroleum naphtha.

6. In an improved varnish or enamel composition for producing imitation leather finishes, comprising the reaction product of the mixture of phenol formaldehyde resin dissolved in natural rosin, litharge, manganese linoleate, cobalt linoleate, China wood oil, linseed oil, heavy petroleum naphtha and light petroleum naphtha.

7. In an improved varnish or enamel composition for producing imitation leather finishes, comprising the reaction product of the mixture of phenol formaldehyde resin dissolved in natural rosin 67 pounds, litharge 3½ pounds, manganese linoleate 8½ pounds, cobalt linoleate 2 pounds, China wood oil 20 gallons, linseed oil 2¼ gallons, heavy petroleum naphtha 14 gallons and light petroleum naphtha 14 gallons.

8. In a method of manufacturing and improving varnish or enamel for imitating leather finishes, mixing China wood oil and linseed oil, heating said oils to approximately 480° F., incorporating said oils with litharge as the oil starts to cool, restoring the temperature back to approximately 460° to 470° F., for approximately 30 minutes, adding manganese linoleate and cobalt linoleate, adding a phenol aldehyde synthetic resin restoring the temperature to approximately 425° F., and thinning with heavy and light petroleum naphthas.

9. In a method of manufacturing and improving varnish or enamel for imitating leather finishes, mixing China wood oil and linseed oil, heating said oils to approximately 480° F., incorporating said oils with litharge as the oil starts to cool, restoring the temperature back to approximately 460° to 470° F., for approximately 30 minutes, adding manganese linoleate and cobalt linoleate, adding a phenol aldehyde synthetic resin restoring the temperature to approximately 425° F., and thinning with heavy and light petroleum naphthas to equal proportions of such naphthas.

10. In an improved method of producing an imitation leather finish in a varnish, mixing 20 gallons of China wood oil and 2¼ gallons linseed oil, heating to 480° F., allowing to cool to approximately 475° F., adding 3½ pounds litharge restoring the temperature to 460–470° F. for approximately 30 minutes, adding 8½ pounds manganese linoleate and 2 pounds cobalt linoleate, adding 67 pounds of synthetic resin dissolved in natural rosin and restoring the temperature to approximately 425° F., said synthetic resin being a phenol aldehyde condensation product.

11. In an improved method of producing an imitation leather finish in a varnish, mixing 20 gallons of China wood oil and 2¼ gallons linseed oil, heating to 480° F., allowing to cool to approximately 475° F., adding 3½ pounds litharge, restoring the temperature to 460–470° F. for approximately 30 minutes, adding 8½ pounds manganese linoleate and 2 pounds cobalt linoleate, adding 67 pounds of synthetic resin dissolved in natural rosin restoring the temperature to approximately 425° F. and thinning means with 14 gallons each of heavy and light petroleum naphthas.

12. In an improved varnish for imitating leather finishes, comprising the reaction product of a mixture of Batu gum, litharge, manganese linoleate, cobalt linoleate, China wood oil, linseed oil, heavy petroleum naphtha and light petroleum naphtha.

13. In an improved varnish for imitating leather finishes, comprising the reaction product of a mixture of Batu gum 67 pounds, litharge 3½ pounds, manganese linoleate 8½ pounds, cobalt linoleate 2 pounds, China wood oil 20 gallons, linseed oil 2¼ gallons, heavy petroleum naphtha 20 gallons, light petroleum naphtha 20 gallons.

14. In an improved varnish for imitating leather finishes, comprising the reaction product of a mixture of Batu gum 67 pounds, litharge 3½ pounds, manganese linoleate 8½ pounds, cobalt linoleate 2 pounds, China wood oil 20 gallons, linseed oil 2¼ gallons, heavy petroleum naphtha 20 gallons, light petroleum naphtha 20 gallons and mixing therewith a synthetic resin 67 pounds, litharge 3½ pounds, manganese linoleate 8½ pounds, cobalt linoleate 2 pounds, China wood oil 20 gallons, linseed oil 2¼ gallons, heavy petroleum naphtha 14 gallons and light petroleum naphtha 14 gallons.

15. In a method of producing varnish imitating a leather finish, comprising mixing China wood oil and linseed oil, heating slowly to 300° or 350° F., adding said oil slowly to Batu gum, carrying the temperature of the mixture to approximately 460–470° F., holding within this range for approximately 30 minutes, stirring litharge into the batch, allowing manganese linoleate and cobalt linoleate to melt in the batch.

16. In a method of producing varnish imitating a leather finish, comprising mixing China wood oil and linseed oil, heating slowly to 300° or 350° F., adding said oil slowly to medium molten Batu gum, carrying the temperature of the mixture to approximately 460–470° F., holding within this range for approximately 30 minutes, stirring litharge into the batch, allowing manganese linoleate and cobalt linoleate to melt in the batch and thinning with naphthas.

17. In a method of producing a varnish for securing an imitation leather finish, heating 20 gallons of China wood oil and 2¼ gallons of refined linseed oil slowly to 300° or 350° F., adding 67 pounds of melted Batu gum by slowly running the oil into the molten gum, carrying the temperature of the mixture to approximately 460–470° F., holding this temperature for approximately 30 minutes, stirring into the batch 3½ pounds litharge, melting into the batch 8½ pounds manganese linoleate and 2 pounds cobalt linoleate.

18. In a method of producing a varnish for securing an imitation leather finish, heating 20 gallons of China wood oil and 2¼ gallons of refined linseed oil slowly to 300° or 350° F., adding 67 pounds of melted Batu gum by slowly running the oil into the gum, carrying the temperature of the mixture to approximately 460–470° F., holding this temperature for approximately 30 minutes, stirring into the batch 3½ pounds litharge, melting into the batch 8½ pounds manganese linoleate, 2 pounds cobalt linoleate and thinning means with 20 gallons each of heavy and light petroleum naphthas.

19. In an improved varnish or enamel composition for producing imitation leather finishes, comprising the reaction product of a mixture of a phenol aldehyde resin 67 pounds, litharge 3½ pounds, manganese linoleate 8½ pounds cobalt linoleate 2 pounds, China wood oil 20 gallons, linseed oil 2¼ gallons, heavy petroleum naphtha 14 gallons and light petroleum naphtha 14 gallons.

20. In an improved varnish or enamel composition for producing imitation leather finishes, comprising the reaction product of a mixture of a phenol aldehyde synthetic resin 67 pounds, litharge 3½ pounds, manganese linoleate 8½ pounds cobalt linoleate 2 pounds, China wood oil 20 gallons, linseed oil 2¼ gallons, heavy petroleum naphtha 14 gallons and light petroleum naphtha 14 gallons.

21. In an improved varnish or enamel composition for producing imitation leather finishes, comprising the reaction product of a mixture of Batu gum 67 pounds, litharge 3½ pounds, manganese linoleate 8½ pounds cobalt linoleate 2 pounds, China wood oil 20 gallons, linseed oil 2¼ gallons, heavy petroleum naphtha 14 gallons and light petroleum naphtha 14 gallons.

22. In an improved method of producing in imitation leather finish in a varnish, mixing 20 gallons of China wood oil and 2¼ gallons linseed oil, heating to 480° F., allowing to cool to approximately 475° F., adding 3½ pounds litharge, restoring the temperature to 460–470° F. for approximately 30 minutes, adding 8½ pounds manganese linoleate and 2 parts cobalt linoleate, adding 67 pounds of a phenol aldehyde resin restoring the temperature to approximately 425° F. and thinning with 14 gallons each of heavy and light petroleum naphtha.

23. In an improved method producing an imitation leather finish in a varnish, mixing 20 gallons of China wood oil and 2¼ gallons linseed oil, heating to 480° F., allowing to cool to approximately 475° F., adding 3½ pounds litharge, restoring the temperature to 460–470° F. for approximately 30 minutes, adding 8½ pounds manganese linoleate and 2 parts of cobalt linoleate, adding 67 parts of Batu gum restoring the temperature to approximately 425° F. and thinning with 14 gallons each of heavy and light petroleum naphtha.

24. A new article of manufacture for use as a lacquer comprising a synthetic resin, wood oil and linseed oil preheated, said oils and resin being mixed and heated from 460 degrees to not above 480 degrees.

25. A new article of manufacture comprising a phenol formaldehyde synthetic resin; a mixture of China wood oil and linseed oil preheated in order that the resulting product may be taken to 480 degrees F. with such retardation of the polymerization of the wood oil as is necessary, the ultimate product being formed by mixing the oils and resin and carrying the temperature to a point between 460 degrees up to but not beyond 480 degrees F.

DALE M. PHILLIPPI.

CERTIFICATE OF CORRECTION.

Patent No. 1,936,913.                                         November 28, 1933.

DALE M. PHILLIPPI.

It is hereby certified that the State of Incorporation of the assignee in the above numbered patent was erroneously given as "Ohio" whereas said State should have been given as Delaware, as shown by the record of assignments in this office; and that the said Letters Patent should be read with this correction therein that the same may conform to the record of the case in the Patent Office.

Signed and sealed this 7th day of December, A. D. 1937.

(Seal)

Henry Van Arsdale,
Acting Commissioner of Patents.